(12) United States Patent
Osborne

(10) Patent No.: US 7,708,091 B2
(45) Date of Patent: May 4, 2010

(54) APPARATUSES AND METHODS FOR PROVIDING HYBRID STEERING FOR A VEHICLE

(75) Inventor: Christopher M. Osborne, Efland, NC (US)

(73) Assignee: Honda Motor Co., Ltd., Tokyo (JP)

( * ) Notice: Subject to any disclaimer, the term of this patent is extended or adjusted under 35 U.S.C. 154(b) by 289 days.

(21) Appl. No.: 12/022,688

(22) Filed: Jan. 30, 2008

(65) Prior Publication Data
US 2009/0188728 A1    Jul. 30, 2009

(51) Int. Cl.
*B60K 17/30* (2006.01)
(52) U.S. Cl. ............... 180/6.24; 180/6.2; 180/6.26; 180/6.32; 180/6.34; 180/6.4; 180/315; 180/78; 280/771; 280/773; 280/778; 280/88; 280/89.13; 280/90; 280/91.1
(58) Field of Classification Search ............ 180/6.24, 180/6.2, 6.26, 6.32, 6.34, 6.4, 315, 78; 280/771, 280/773, 778, 88, 89.13, 90, 91.1
See application file for complete search history.

(56) References Cited

U.S. PATENT DOCUMENTS

| | | | |
|---|---|---|---|
| 1,294,748 A | 2/1919 | Zoeller | |
| 1,334,421 A | 3/1920 | Ware | |
| 1,512,510 A | 10/1924 | Traphagen | |
| 1,937,839 A | 12/1933 | Parrett | |
| 1,980,033 A | 11/1934 | Brown | |
| 2,157,273 A | 5/1939 | Stancil | |
| 2,453,417 A | 11/1948 | Dufour | |
| 4,065,144 A * | 12/1977 | Winchell | 280/771 |
| 4,571,786 A * | 2/1986 | Osujo | 74/485 |
| 4,738,327 A * | 4/1988 | Takei | 180/68.1 |
| 4,920,734 A | 5/1990 | Wenzel | |
| 5,018,592 A | 5/1991 | Buchdrucker | |
| 5,529,135 A | 6/1996 | Wenzel et al. | |
| 6,185,920 B1 * | 2/2001 | Oxley | 56/14.7 |
| 6,434,917 B1 | 8/2002 | Bartel | |
| 6,572,125 B2 | 6/2003 | Erickson et al. | |
| 6,601,663 B2 | 8/2003 | Hauser | |
| 6,874,305 B2 | 4/2005 | Ishimori | |
| 7,046,917 B1 * | 5/2006 | Lin | 388/824 |
| 7,337,870 B2 * | 3/2008 | Izukura et al. | 180/307 |
| 2003/0154632 A1 | 8/2003 | Dowe et al. | |
| 2006/0175098 A1 | 8/2006 | Sutherland | |
| 2007/0289785 A1 * | 12/2007 | Mayer et al. | 180/6.32 |

* cited by examiner

*Primary Examiner*—Lesley Morris
*Assistant Examiner*—Marlon A Arce
(74) *Attorney, Agent, or Firm*—Jenkins, Wilson, Taylor & Hunt, P.A.

(57) ABSTRACT

Steering control apparatuses and methods for a vehicle are provided. A steering control apparatus can include a steering shaft drivingly linked to a pair of front wheels of a vehicle. A movable steering handle can also be provided and disposed about the steering shaft, with the steering handle being capable of selectively turning the pair of front wheels to direct the movement of the vehicle. A first and second brake clutch mechanism for engaging and disengaging first and second drive wheels, respectively, can be provided. First and second brake clutch control levers can selectively control the first and second brake clutch mechanism, respectively, to engage and disengage the first and second drive wheels. The steering handle can include a coupling base. The coupling base can engage the steering shaft to permit decoupling of the steering handle from the steering shaft allowing the steering shaft and the linked pair of front wheels to turn free of the steering handle while the steering handle is still disposed about the steering shaft.

25 Claims, 11 Drawing Sheets

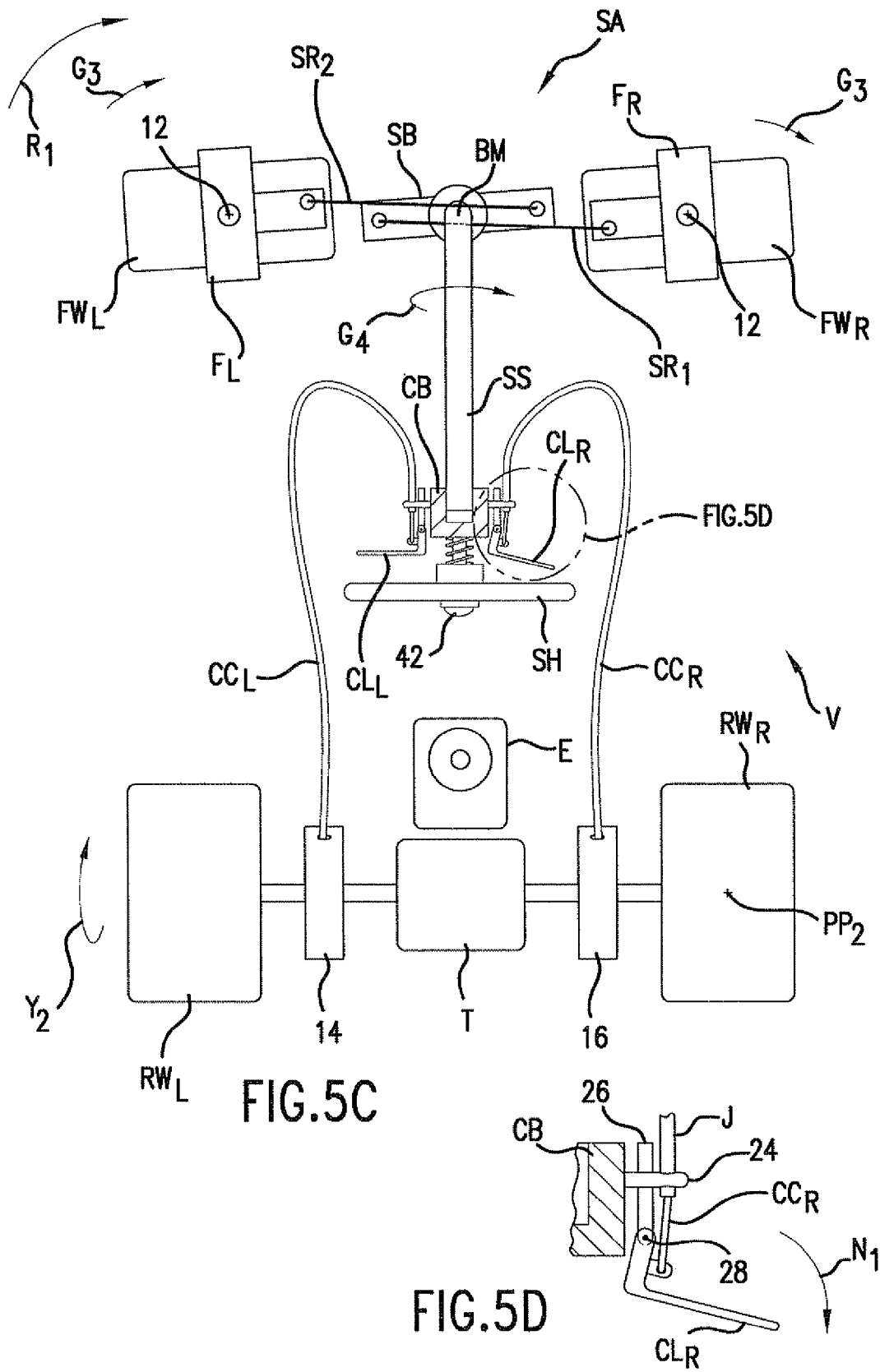

APPARATUSES AND METHODS FOR PROVIDING HYBRID STEERING FOR A VEHICLE

TECHNICAL FIELD

The present subject matter generally relates to steering control apparatuses and methods for vehicles having hybrid steering capabilities. More particularly, the present subject matter relates to steering control apparatuses and methods in which steering can be performed through a steering wheel or a pair of left and right control levers that can provide zero turning radius (ZTR) capability.

BACKGROUND

Many types of vehicles, and particularly utility vehicles such as lawn mowers, tractors and the like, are steered to the left and right through the operation of independently controlled drive wheels. For instance, to turn such a vehicle to the left, the left drive wheel can be slowed relative to the right drive wheel such that the greater percentage of torque produced by the vehicle's motor is transmitted to the right drive wheel. Such vehicles can be controlled through left and right control levers. Further, many of these types of vehicles are steered by a steering handle such as a steering wheel which operates a front set of wheels through a steering column.

These different types of steering provide different benefits. For example, steering through an independent drive of rear wheels using control levers allows ZTR capabilities to make the vehicle more agile and responsive. On the other hand, using a steering handle is more comfortable for the driver of the vehicle due to its familiarity.

Vehicles have been designed in the past that provide both types of steering. However, the steering handle often stays engaged creating a safety hazard for the driver of the vehicle. Others have been designed to disengage the steering column of the vehicle when the control levers are used to steer the vehicle. However, the design of such a vehicle is complicated and the steering column can be hard to work on. Failure of the disengaging mechanism can require significant disassembly of the vehicle.

It would therefore be advantageous to provide apparatuses and methods for steering a vehicle using a steering wheel controlled transmission system, and also to provide an ability to steer a vehicle at a zero turn radius that is easy to operate and maintain.

SUMMARY

In accordance with this disclosure, hybrid steering apparatuses and methods are provided. It is, therefore, an object of the present disclosure to provide steering apparatuses and methods that provide both steering through a steering column and through a zero-turn-radius system with the steering apparatuses permitting an operator to switch between the two. This and other objects as can become apparent from the present disclosure are achieved, at least in whole or in part, by the subject matter described herein.

BRIEF DESCRIPTION OF THE DRAWINGS

A full and enabling disclosure of the present subject matter including the best mode thereof to one of ordinary skill in the art is set forth more particularly in the remainder of the specification, including reference to the accompanying figures, in which:

FIG. 5A illustrates a partial cross-sectional top plan view of a portion of the hybrid steering apparatus according to FIG. 5A;

FIG. 5C illustrates a partial cross-sectional top plan view of the hybrid steering apparatus portion of the riding type utility vehicle according to FIG. 1 with the front wheels directed to the right using control levers to steer;

FIG. 5D illustrates a partial cross-sectional top plan view of a portion of the hybrid steering apparatus according to FIG. 5C;

DETAILED DESCRIPTION

Reference will now be made in detail to possible embodiments of the present subject matter, one or more examples of which are shown in the figures. Each example is provided to explain the subject matter and not as a limitation. In fact, features illustrated or described as part of one embodiment can be used in another embodiment to yield still a further embodiment. It is intended that the present subject matter cover such modifications and variations.

Figure 1:
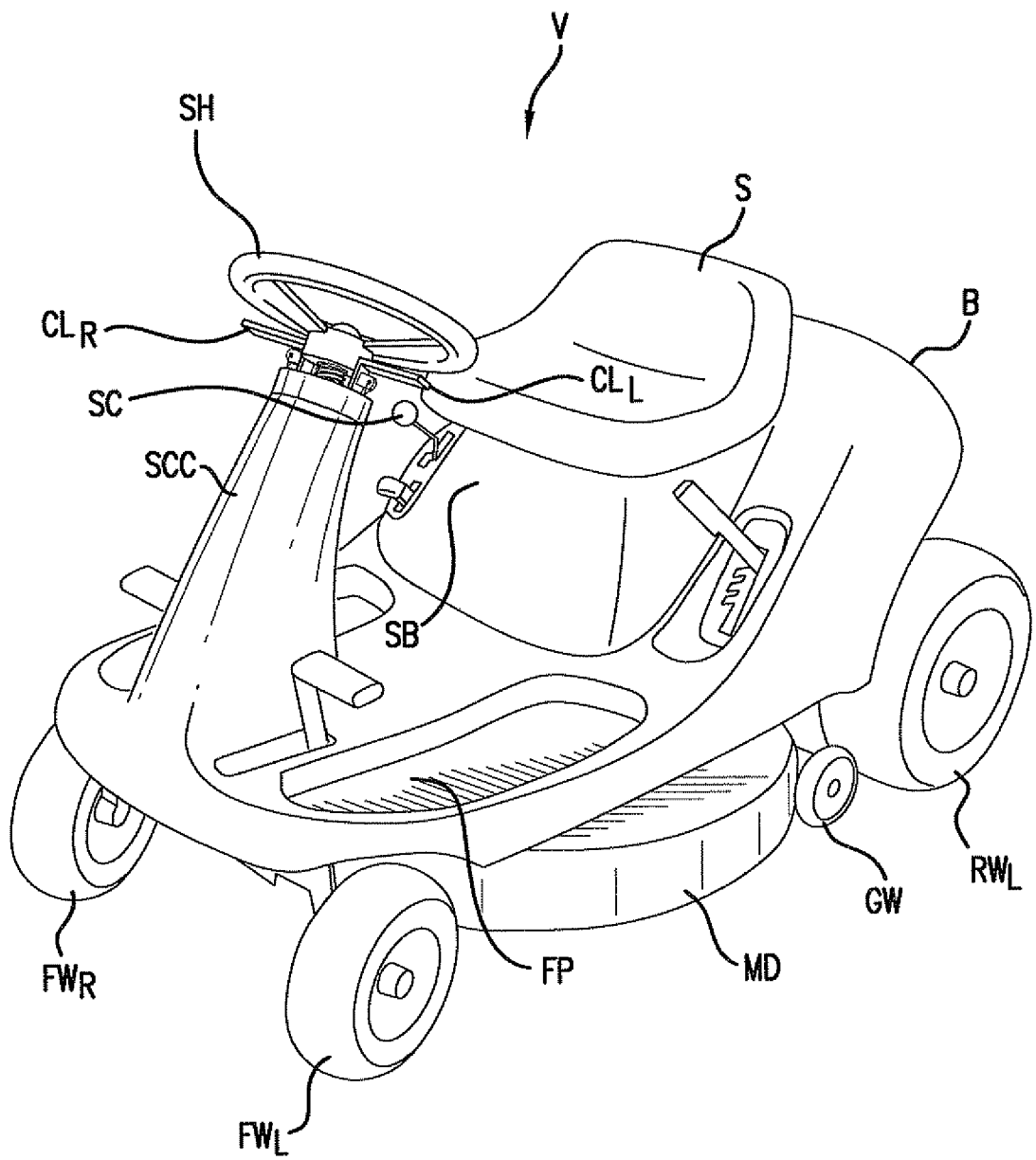
FIG. 1 illustrates a perspective view of an embodiment of a riding type utility vehicle that employs an embodiment of a hybrid steering apparatus according to the present subject matter.

Referring to FIG. 1, a riding-type utility vehicle, generally designated V, is illustrated as an example of a steerable vehicle which employs a hybrid steering system that permits steering through a steering handle SH in a conventional manner or steering through control levers that provide zero-turn-radius capabilities. Vehicle V is illustrated as a riding lawn-mower, although the subject matter encompasses any type of mobile, wheel-driven, steerable, engine-powered equipment. Vehicle V can include a pair of left and right front wheels $FW_L$, $FW_R$, a pair of left and right rear driven wheels $RW_L$, $RW_R$ (see FIG. 2), and a body B mounted on a vehicle frame. Body B of vehicle V can include a floor panel FP, steering column cover SCC and seat base SB. Seat S for a passenger can be mounted on seat base SB.

Figure 2:
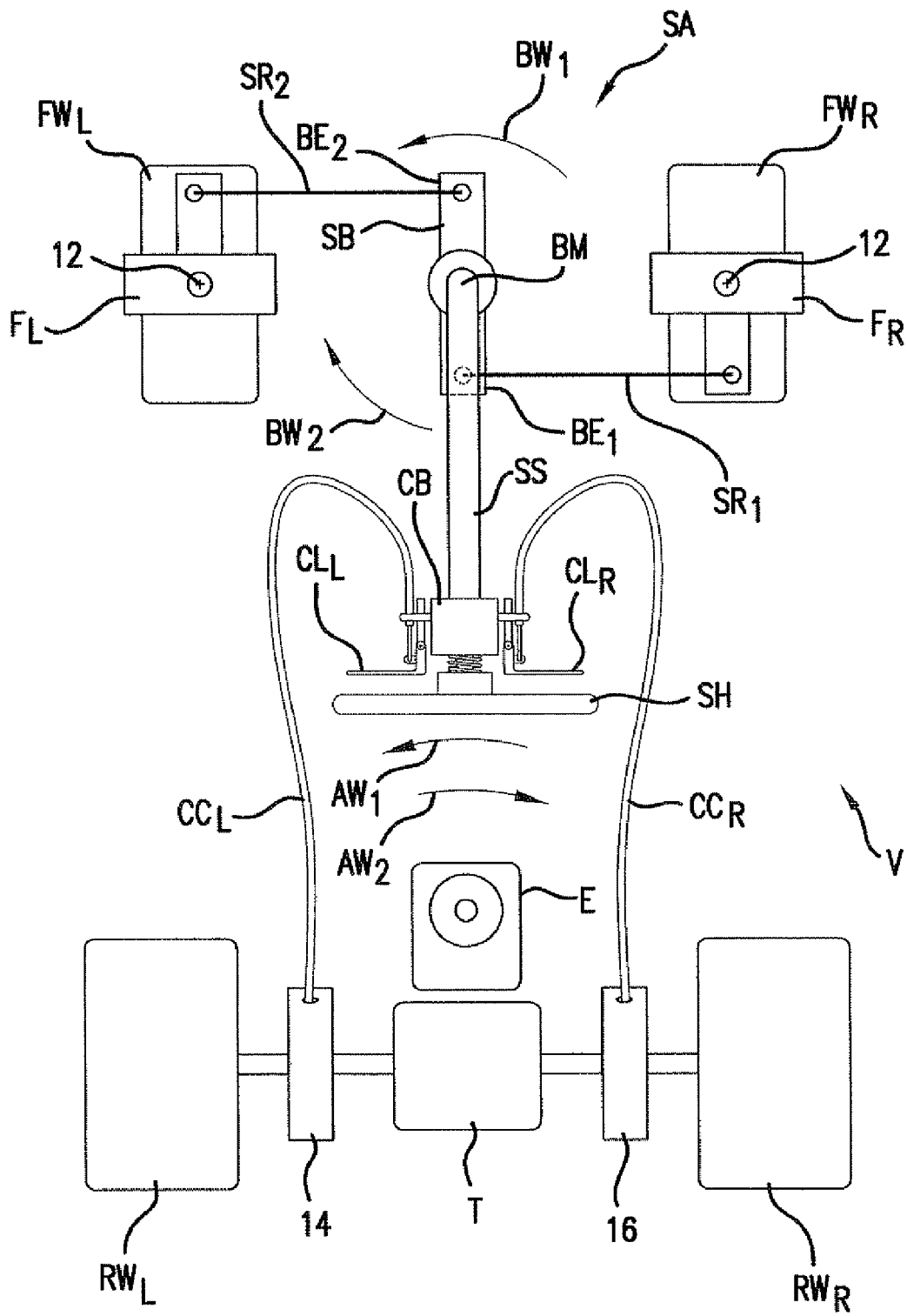
FIG. 2 illustrates a top plan view of a hybrid steering apparatus portion of a riding type utility vehicle according to FIG. 1 with the front wheels directed straightforward.

Steering handle SH in the form of a steering wheel can be positioned above an upper portion of steering column cover SCC and can be attached to a steering shaft SS (see FIG. 2). Steering handle SH can be used to steer vehicle V by turning the front wheels $FW_L$, $FW_R$. Vehicle V can also include control levers $CL_L$, $CL_R$ that can extend from the upper portion of steering column cover SCC. Control levers $CL_L$, $CL_R$ can also be used to control the steering of vehicle V or to brake vehicle V as described further below.

A mowing deck MD can be disposed below vehicle body B between front wheels $FW_L$, $FW_R$ and rear wheels $RW_L$, $RW_R$ or can be disposed in any other suitable location. One or more guide wheels GW can be used to help support mowing deck MD. As can be appreciated by persons skilled in the art, mowing deck MD can house one or more sets of cutting blades (not shown) that can be rotatably driven by engine E (see FIG. 2) through a suitable coupling assembly (not shown). At the right side of seat S, transmission speed change lever SC can be provided for moving vehicle V forward and backward and adjusting the speed of vehicle V.

FIG. 2 is a schematic illustration of portions of vehicle V that can influence steering. Steering handle SH can be configured for coupling with steering shaft SS so that steering handle SH can be used to turn front wheels $FW_L$, $FW_R$. Steering handle SH can also be configured for decoupling from steering shaft SS where front wheels $FW_L$, $FW_R$ are allowed to turn free of steering handle SH while steering handle SH can still be disposed about steering shaft SS. For example, steering handle SH can include a coupling base CB configured for interconnecting steering shaft SS and steering handle SH. Coupling base CB can be the portion of steering handle SH that is configured for coupling with steering shaft SS so that steering handle SH can be used to turn front wheels $FW_L$, $FW_R$ and for decoupling from steering shaft SS so that front wheels $FW_L$, $FW_R$ are allowed to turn free of steering handle SH while steering handle SH can still be disposed about steering shaft SS.

In some embodiments in which a coupling base is used, the coupling base can be apart of the steering handle. In other embodiments in which a coupling base is used, the coupling base can be separate from the steering handle. It is intended that the present subject matter cover such modifications and variations.

Steering handle SH can thus be secured by coupling base CB to steering shaft SS. Steering handle SH can be, for example, a rounded steering wheel, a rectangle shaped steering wheel, or the like. In the position of coupling base CB shown in FIG. 2, steering handle SH is coupled to steering shaft SS of vehicle V so that as the steering handle SH is rotated, steering shaft SS is also rotated. Steering shaft SS can be secured to a steering assembly SA. Steering assembly SA can be any steering assembly that permits controlled turning of left and right front wheels $FW_L$, $FW_R$. As in the embodiment shown, steering assembly SA can include a steering bar SB that rotates as steering shaft SS rotates. Steering bar SB can have a first end $BE_1$ and a second end $BE_2$ as well as a midpoint BM at or near a center portion of the steering bar SB. Steering shaft SS can be secured to steering bar SB at or about midpoint BM of the steering bar SB.

Steering assembly SA can also include wheel frames $F_L$, $F_R$ that respectively support front wheels $FW_L$, $FW_R$ and rotate front wheels $FW_L$, $FW_R$ as wheel frames $F_L$, $F_R$ are rotated. Left and right wheel frames $F_L$, $F_R$ can be respectively attached to the frame of vehicle V and rotatable therein. Left and right wheel frames $F_L$, $F_R$ are connected to steering bar SB by first and second steering rods $SR_1$, $SR_2$. In particular, left wheel frame $F_L$ can be connected to second end $BE_2$ of steering bar SB by second steering rod $SR_2$ and right wheel frame $F_R$ can be connected to first end $BE_1$ of steering bar SB by first steering rod $SR_1$. Thus, as steering shaft SS rotates steering bar SB, the respective steering rods $SR_1$, $SR_2$ push or pull left and right wheel frames $F_L$, $F_R$ causing the left and right wheel frames $F_L$, $F_R$ and the left and right front wheels $FW_L$, $FW_R$ to rotate about vertical axes 12.

Engine E, which typically can be a single-cylinder, 4-cycle internal combustion engine, can be provided on a rear portion of the vehicle frame. Engine E can engage transmission system T to rotate the left and right rear wheels $RW_L$, $RW_R$. The transmission system T can include a standard transmission with differentials to permit the left and right rear wheels $RW_L$, $RW_R$ to rotate at different speeds. In this manner, the driving force of engine E drives left and right rear wheels $RW_L$, $RW_R$. A left brake clutch 14 can be positioned intermediate the transmission system T and the left rear wheel $RW_L$. A right brake clutch 16 can be positioned intermediate transmission system T and right rear wheel $RW_R$. Left and right brake clutches 14, 16 can be any conventional brake clutch used in drive systems to stop rotation of an associated wheel. Left and right brake clutches 14, 16 are normally engaged such that the left and right rear wheels $RW_L$, $RW_R$ are driven by the transmission system T. Two control cables $CC_L$ and $CC_R$ extend from the left and right brake clutches 14, 16, respectively, to control levers $CL_L$, $CL_R$ disposed to coupling base CB on either side of steering handle SH and steering shaft SS. If both control levers $CL_L$, $CL_R$ are activated, then left and right brake clutches 14, 16 are disengaged and the left and right rear wheels $RW_L$, $RW_R$ are braked to prevent rotation, thereby braking the vehicle V. Conventional braking methods for riding mowers or other power driven equipment can also be used to stop forward or rearward progress of vehicle V.

In the position shown in FIG. 2 with coupling base CB coupling the steering handle SH to the steering shaft SS, the steering shaft SS can rotate as steering handle SH rotates. If steering handle SH is turned in a direction $AW_1$, steering shaft SS can rotate to cause steering bar SB to rotate in direction $BW_1$. The movement of steering bar SB in direction $BW_1$ can rotate the left and right front wheels $FW_L$, $FW_R$ in the same direction about axes 12. If steering handle SH is turned in the direction $AW_2$, steering shaft SS can rotate to cause steering bar SB to rotate in direction $BW_2$. The movement of steering bar SB in direction $BW_2$ can rotate the left and right front wheels $FW_L$, $FW_R$ in the same direction about axes 12. In this manner, steering shaft SS allows turning of both front wheels by steering handle SH to direct the forward and reverse motion of vehicle V when coupling base CB couples steering shaft SS with steering handle SH.

When coupling base CB decouples steering handle SH from steering shaft SS, control levers $CL_L$, $CL_R$ can be used to steer vehicle V by braking the respective left and right rear wheels $RW_L$, $RW_R$ through activating the respective left and right brake clutches 14, 16. Once coupling base CB decouples steering handle SH from steering shaft SS, steering handle SH can rest idle, even when vehicle V is being turned while steering shaft SS continues to rotate as the front wheels $FW_L$, $FW_R$ turn.

In operation, as one of the control levers $CL_L$, $CL_R$ is activated, the associated rear wheel $RW_L$, $RW_R$ stops rotating while the other rear wheel $RW_R$, $RW_L$ continues to rotate causing the vehicle to turn in the direction of the stopped rear wheel $RW_L$, $RW_R$. For example, if left control lever $CL_L$ is activated, left rear wheel $RW_L$ stops rotating while right rear wheel $RW_R$ continues to rotate. The continued rotation of right rear wheel $RW_R$ causes steering bar SB to rotate in direction $BW_1$ turning the front wheels $FW_L$, $FW_R$ which remain in parallel alignment to turn to the left. The continued rotation of right rear wheel $RW_R$ and the turning of the front wheels $FW_L$, $FW_R$ to the left cause vehicle V to turn to the left. Similarly, if right control lever $CL_R$ is activated, right rear wheel $RW_R$ stops rotating while left rear wheel $RW_L$ continues to rotate. The continued rotation of left rear wheel $RW_L$ causes steering bar SB to rotate in direction $BW_2$ turning the front wheels $FW_L$, $FW_R$ which remain in parallel alignment to turn to the right. The continued rotation of left rear wheel $RW_L$ and the turning of the front wheels $FW_L$, $FW_R$ to the right cause vehicle V to turn to the right.

Figure 3A:
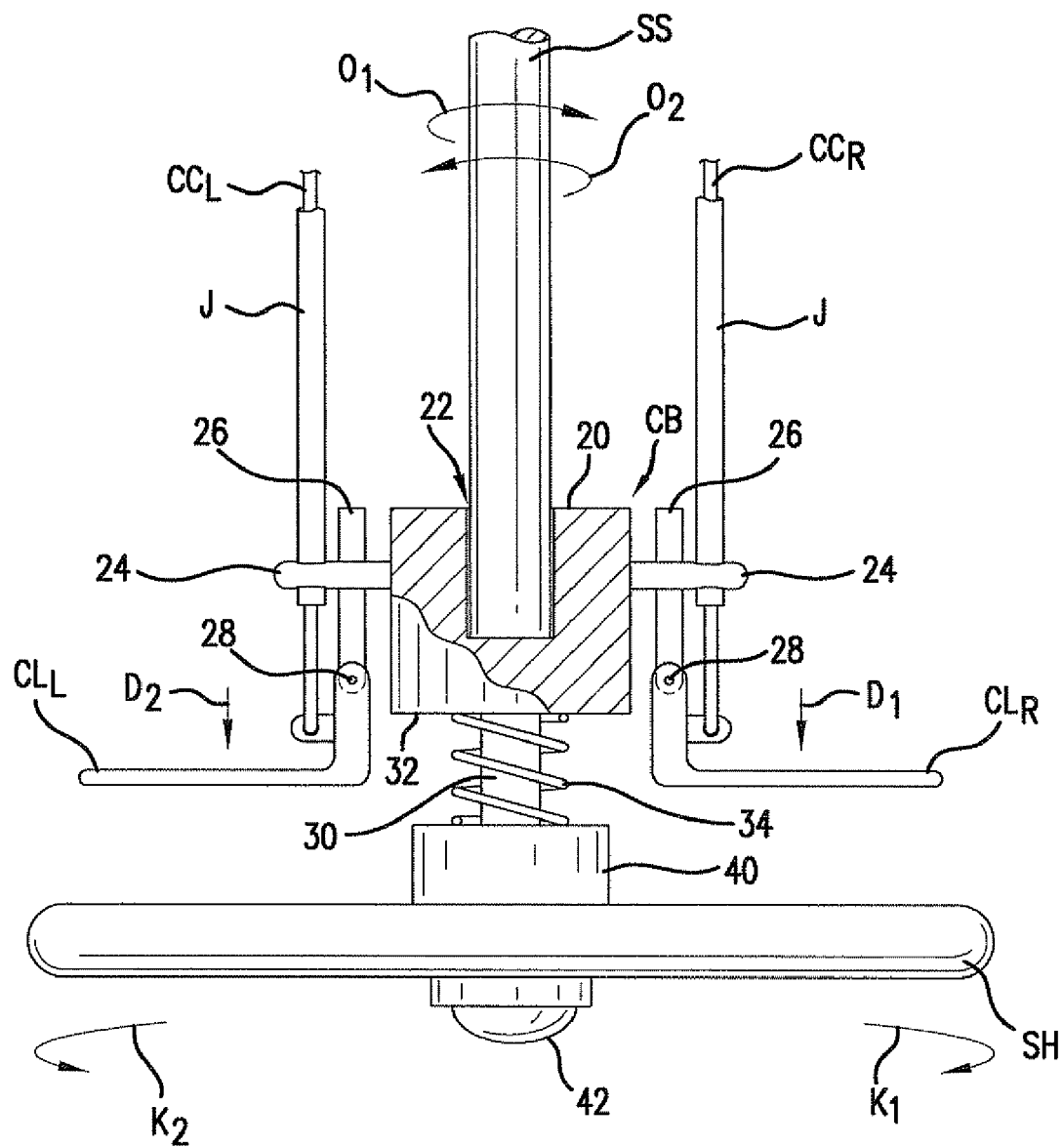
FIG. 3A illustrates a partial cross-sectional top plan view of a portion of an embodiment of a hybrid steering apparatus according to the present subject matter with a steering handle engaging a steering shaft.
Figure 3B:
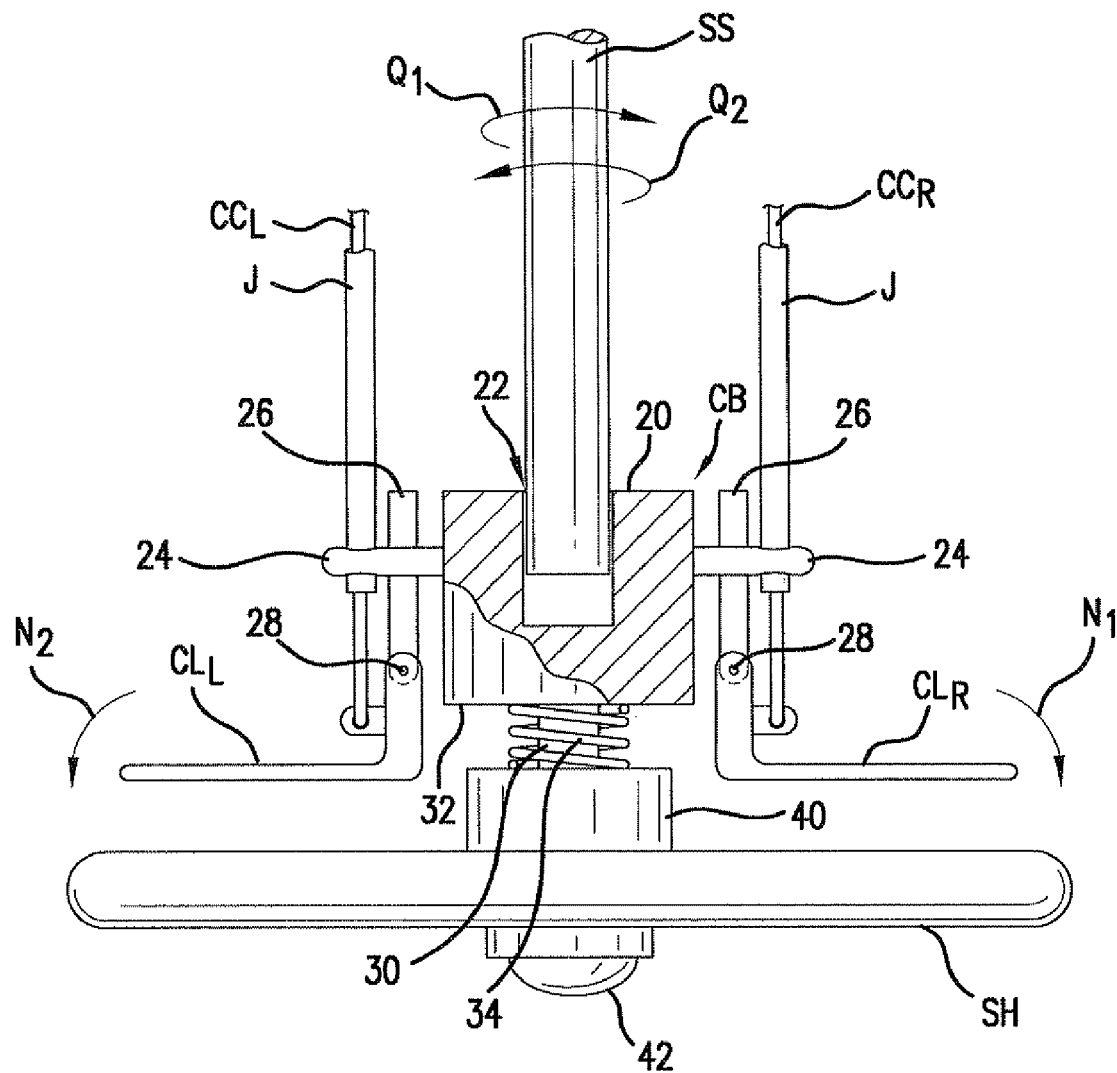
FIG. 3B illustrates a partial cross-sectional top plan view of the portion of the hybrid steering apparatus according to FIG. 3A with the steering handle disengaging the steering shaft.

FIGS. 3A and 3B illustrate a partial cut-away view of coupling base CB. In FIG. 3A, coupling base CB is in an engaged position with steering handle SH coupled to steering shaft 5. In FIG. 3B, coupling base CB is in a disengaged position with steering handle SH decoupled from steering shaft SS. Coupling base CB can include a body 20 with a chamber 22 therein for receiving the steering shaft SS. In the embodiment shown, coupling base CB can include arms 24 that extend outward from body 20 on opposite sides at an angle transverse to the direction of the steering shaft SS. Each arm 24 can include a fulcrum base 26 to which a respective control lever $CL_L$, $CL_R$ can be pivotally secured. In particular, control levers $CL_L$, $CL_R$ can be secured to fulcrum bases 26 at pivot points 28 so that control levers $CL_L$, $CL_R$ can pivot inward about the respective pivot points 28 towards coupling base CB. Arms 24 can also hold jackets J of the respective control cables $CC_L$, $CC_R$, while control cables $CC_L$, $CC_R$ are movably secured to the respective control levers $CL_L$, $CL_R$.

Coupling base CB can be attached to the steering handle SH through a connection shaft 30. In particular, connection shaft 30 can extend between a side 32 of body 20 of coupling base CB and a hub 40 of steering handle SH. Coupling base CB can move axially up and down connection shaft 30 toward and away from the steering handle SH. Alternatively, as coupling base CB is moved axially toward and away from steering handle SH, connection shaft 30 can slide up and down within hub 40 of steering handle SH. A biasing element 34 can be placed between the coupling base CB and hub 40 of steering handle SH to bias coupling base CB toward steering shaft SS as shown in FIG. 3A. Steering handle SH can include a twist cam 42 to prevent the decoupling of coupling base CB from the steering shaft SS by locking coupling base CB in place to prevent the movement of coupling base CB up and down the connection shaft 30.

In FIG. 3A, steering handle SH can be coupled to steering shaft SS by coupling base CB. Coupling base CB can provide a detachable, mechanical connection to steering shaft SS. For example, steering shaft SS and coupling base CB can have a key and keyway arrangement or a tongue and groove arrangement that allows steering handle SH to be detachable from steering shaft SS. In this manner, coupling base CB can be secured to steering shaft SS such that steering handle SH can be used to turn the wheels engaged by steering shaft SS. For example, if steering handle SH is turned in the direction $K_1$, steering shaft SS is rotated in the direction $O_1$. Similarly, if steering handle SH is turned in the direction $K_2$, steering shaft SS is rotated in the direction $O_2$. As described above, bias element 34 biases coupling base CB towards its position in FIG. 3A in an engaged position with steering shaft SS.

To disengage the coupling base CB from steering shaft SS, coupling base CB is moved toward steering handle SH and away from steering shaft SS. For example, control levers $CL_L$, $CL_R$ can be simultaneously pulled in directions $D_1$ and $D_2$, thereby pulling coupling base CB toward hub 40 and compressing bias element 34. While pulling on both control levers $CL_L$, $CL_R$ will cause them to pivot, the force applied on both sides of the coupling base CB in directions $D_1$ and $D_2$ will cause the axial movement of coupling base CB described above. Once the coupling base is in the position shown in FIG. 3B, twist cam 42 can lock coupling base CB in place with bias element 34 compressed. In such a position as shown in FIG. 3B, coupling base CB is disengaged from steering shaft SS so that steering shaft SS rotates freely within coupling base GB. In this manner, steering handle SH is decoupled from steering shaft SS.

In such a decoupled state, control levers $CL_L$, $CL_R$ can be used to steer vehicle V as described above, while steering shaft SS is free to rotate without the rotation of steering handle SH. For example, if control lever $CL_L$ is pivoted in the direction $N_1$, the left rear wheel brakes as the right rear wheel rotates. This causes steering shaft SS to rotate in the direction $Q_1$. Similarly, if control lever $CL_R$ is pivoted in the direction $N_2$, the right rear wheel brakes as the left rear wheel rotates. This causes steering shaft SS to rotate in the direction $Q_2$.

For safety reasons, coupling base CB can be self-centering so that the steering shaft SS is only re-engaged by coupling base CB as front wheels $FW_L$, $FW_R$, align parallel with rear wheels $RW_L$, $RW_R$ so that steering handle SH is recoupled with steering shaft SS only when vehicle V is aligned to move straightforward. To accomplish this, a single key and keyway arrangement between steering shaft SS and coupling base CB can be used so that coupling base CB and steering shaft SS must be in the same alignment each time for coupling base CB to re-engage steering shaft SS.

Figure 4A:
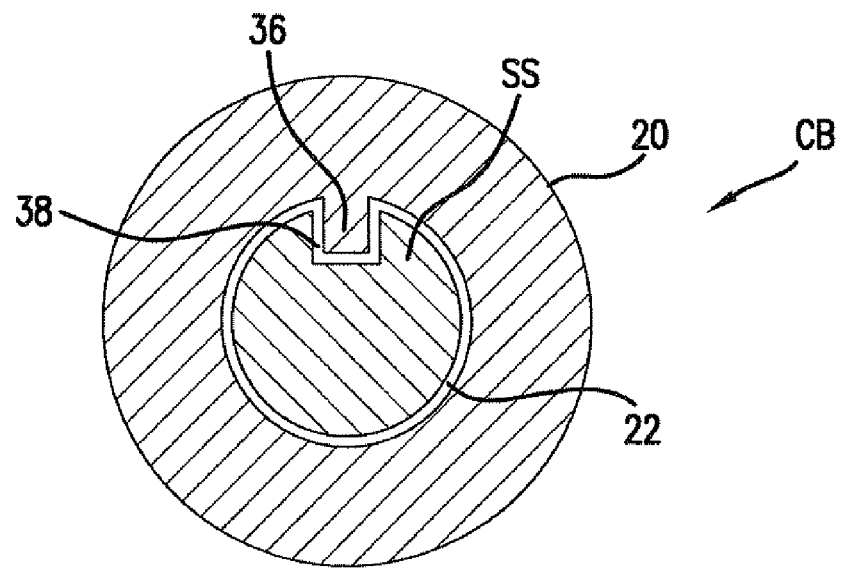
FIG. 4A illustrates a transverse cross-sectional view of an embodiment of a coupling base and a steering shaft of an embodiment of a hybrid steering apparatus according to the present subject matter.
Figure 4B:
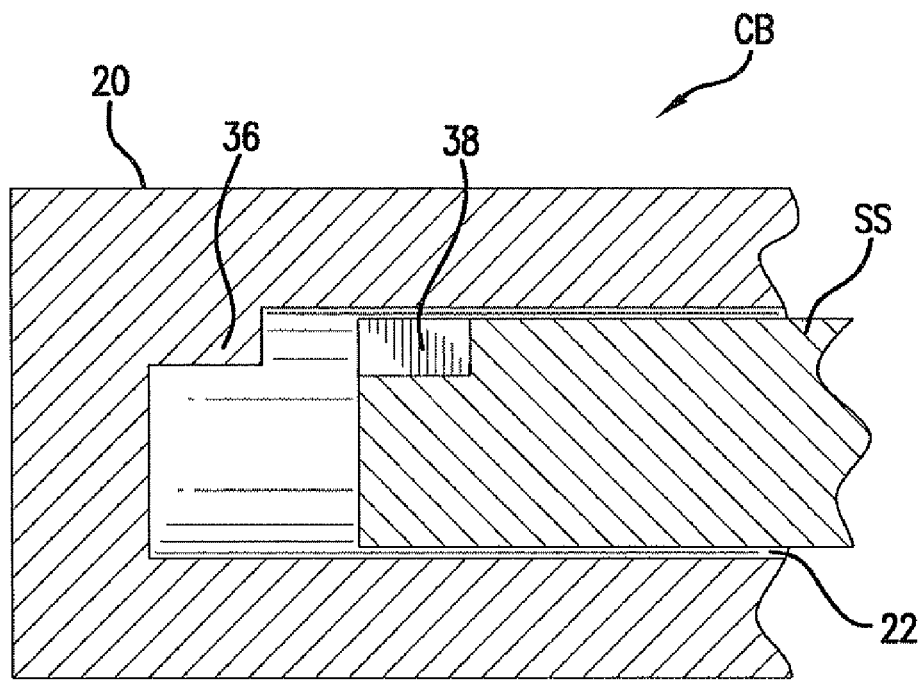
FIG. 4B illustrates a longitudinal cross-sectional view of the coupling base and the steering shaft of the hybrid steering apparatus according to the FIG. 4A.

For example, FIGS. 4A and 4B illustrate an embodiment of such a key and keyway arrangement. FIG. 4A illustrates a transverse cross-section through coupling base CB and steering shaft SS near the point where the end of steering shaft SS abuts the end of chamber 22 within body 20 of coupling base CB. A key 36 can be integral to body 20 of coupling base CB and have dimensions to permit sliding engagement with a keyway 38 defined within shaft SS. Such alignment of key 36 of coupling base CB with keyway 38 in steering shaft SS can occur when coupling base CB and steering shaft SS are aligned as shown in FIG. 2 with steering shaft SS having the pair of front wheels $FW_L$, $FW_R$, pointing straight ahead and parallel with rear wheels $RW_L$, $RW_R$ and control levers $CL_L$, $CL_R$ in level alignment for ease of use for the operator. At this point, if twist cam 42 or some other locking mechanism has released coupling base CB, the forces of the bias element 34 force coupling base CB toward steering shaft SS. Once steering shaft SS and coupling base CB are properly aligned, key 36 of coupling base CB can slide into keyway 38 of steering shaft SS.

FIG. 4B shows a longitudinal cross-section through both coupling base CB and steering shaft SS. Coupling base CB is disengaged from steering shaft SS. As shown in this embodiment, key 36 can extend only a portion of the depth of chamber 22 within body 20 of coupling base CB. In this manner, when key 36 is disengaged from keyway 38 of steering shaft SS, steering shaft SS can still reside within chamber 22 of body 20 of coupling base CB. Chamber 22 can be deep enough to allow steering shaft SS to freely rotate therein. Thereby, coupling base CB can be allowed to be disengaged from steering shaft SS while still having coupling base CB disposed around steering shaft SS. Again, once the locking device allows bias element 34 to force coupling base CB toward steering shaft SS when proper alignment of key 36 of coupling base CB has occurred with keyway 38 of steering shaft SS, key 36 can slide into keyway 38 thereby engaging coupling base CB with steering shaft SS and thus coupling steering handle SH with steering shaft SS.

Figures 5A, 5B:
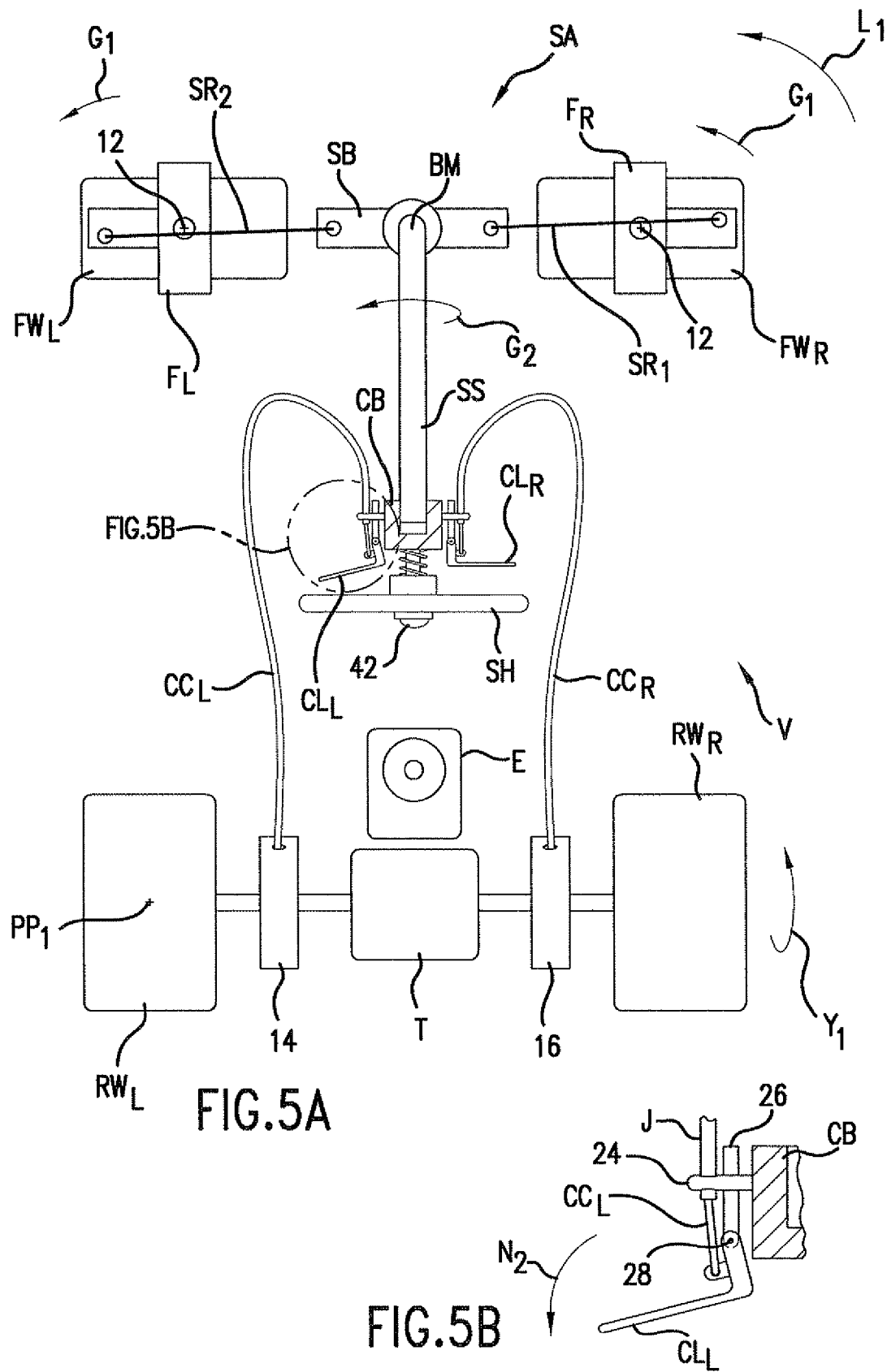
FIG. 5A illustrates a partial cross-sectional top plan view of the hybrid steering apparatus portion of the riding type utility vehicle according to FIG. 1 with the front wheels directed to the left using control levers to steer.

Once coupling base CB is moved to a disengaged position and locked therein, steering handle SH is decoupled from steering shaft SS and front wheels $FW_L$, $FW_R$, can then spin about 360° since steering shaft SS is permitted to rotate freely within channel 22 of coupling base CB. At this point, control levers $CL_L$, $CL_R$ can be used to steer vehicle V with zero-turn-radius ("ZTR") steering as shown in FIGS. 5A-5D. As shown in FIGS. 5A and 5C, coupling base CB has been moved to a position where steering handle SH is decoupled from steering shaft SS. In this manner, steering handle SH can sit idle even while steering shaft SS rotates. Engine E drives transmission system T that includes differentials. Transmission system T, in turn, is used to drive left and right rear wheels $RW_L$, $RW_R$. Brake clutch 14 is positioned intermediate transmission system T and left rear wheel $RW_L$, and brake clutch 16 is positioned intermediate transmission system T and right rear wheel $RW_R$. Control cables $CC_L$, $CC_R$ can connect control levers $CL_L$, $CL_R$ to brake clutch 14 and brake clutch 16, respectively.

Depending on the activation of either control levers $CL_L$, $CL_R$, the respective brake clutch 14, 16 can be disengaged to brake the respective rear wheel $RW_L$, $RW_R$ to cause steering assembly SA including steering shaft SS to turn in one direction or the other. As described above, when using control levers $CL_L$, $CL_R$ to steer vehicle V, the movement of left and right rear wheels $RW_L$, $RW_R$ can dictate the direction in which front wheels $FW_L$, $FW_R$ rotate about axes 12. This rotation then can cause wheel frames $F_L$, $F_R$ to rotate which rotation is transferred to steering rods $SR_1$, $SR_2$ and steering bar SB which, in turn, rotates steering shaft SS. Thereby, the rotation of steering assembly SA can occur collectively from the bottom up when steering is performed by control levers $CL_L$, $CL_R$, instead of occurring from the top down when steering handle SH is used to steer through steering shaft SS.

FIGS. 5A and 5B illustrate how vehicle V can be turned to the left through steering conducted by control levers $CL_L$, $CL_R$. As shown in FIG. 5B, control lever $CL_L$ can be pivoted about pivot point 28 of fulcrum base 26 in a direction $N_2$. Fulcrum base 26 can be secured to coupling base CB by arm 24 which can also secure jacket J of control cable $CC_L$. As control lever $CL_L$ rotates in direction $N_2$, control cable $CC_L$ can be pulled forward thereby activating brake clutch 14 causing brake clutch 14 to brake left rear wheel $RW_L$. At the same time, rear wheel $RW_R$ can still be driven by transmission system T so that right wheel $RW_R$ rotates in direction $Y_1$. This setup creates a pivot point $PP_1$ about left rear wheel $RW_L$ around which vehicle V rotates in direction $L_1$. As vehicle V begins to rotate in direction $L_1$ front wheels $FW_L$, $FW_R$ begin to rotate in a direction $G_1$ from a position as shown in FIG. 2 to a position shown in FIG. 5A. This rotation, in turn, can cause steering assembly SA and vehicle V to turn to the left in a direction $G_2$ with the turn having effectively a zero-turn-radius. When the control lever $CL_L$ is released the forward rotation of both rear wheels $RW_L$, $RW_R$ causing front wheels $FW_L$, $FW_R$ to assume the straight ahead position shown in FIG. 2.

Similarly, FIGS. 5C and 5D illustrate how steering through control levers $CL_L$, $CL_R$ can turn vehicle V to the right. As shown in FIG. 5, control lever $CL_R$ can be pivoted in a direction $N_1$ about pivot point 28 of fulcrum base 26. Fulcrum base 26 can be positioned near coupling base CB by arm 24 which extends therefrom. Arm 24 can also hold jacket J of control cable $CC_R$. As control lever $CL_R$ is pivoted in direction $N_1$, control cable $CC_R$ can be pulled forward thereby activating brake clutch 16 to brake right rear wheel $RW_R$. At the same time, transmission system T continues to drive left rear wheel $RW_L$ in a rotational direction $Y_2$. As left rear wheel $RW_L$ continues to rotate, vehicle V rotates about pivot point $PP_2$ causing the vehicle to turn in direction $R_1$. This rotation of vehicle V in direction $R_1$ causes front wheels $FW_L$, $FW_R$ to rotate in a direction $G_3$ from a position as shown in FIG. 2 to a position as shown in FIG. 5C. This rotation of front wheels $FW_L$, $FW_R$, in turn, can cause steering assembly SA and steering shaft SS to rotate in the same direction $G_4$. Thus, vehicle V can turn in direction $R_1$ in a manner that creates a zero-turn-radius. As the control lever $CL_R$ is released, right rear wheel $RW_R$ can begin to rotate in a forward direction at a similar speed to left rear wheel $RW_L$. Front wheels $FW_L$, $FW_R$ then can rotate to a position as shown in FIG. 2 causing vehicle V to drive straight forward.

The embodiments disclosed herein are not limited to any particular configuration of steering assembly configuration as long as the turning of the front wheels can be controlled by a steering shaft or by control of the rear wheels. The example provided above is by way of explanation of one possible steering assembly. Other variations and modifications can also be used.

Further, the embodiments disclosed herein are not limited to any particular configuration of steering handle and coupling base as long as the coupling base permits decoupling of steering handle SH from steering shaft SS while still being disposed about steering shaft SS. Specific examples are provided in FIGS. 6A-7B of embodiments which can be used to implement the present subject matter. However, other variations and modifications can also be used. It is intended that such variations and modifications are covered by the present subject matter described herein.

Figure 6A:
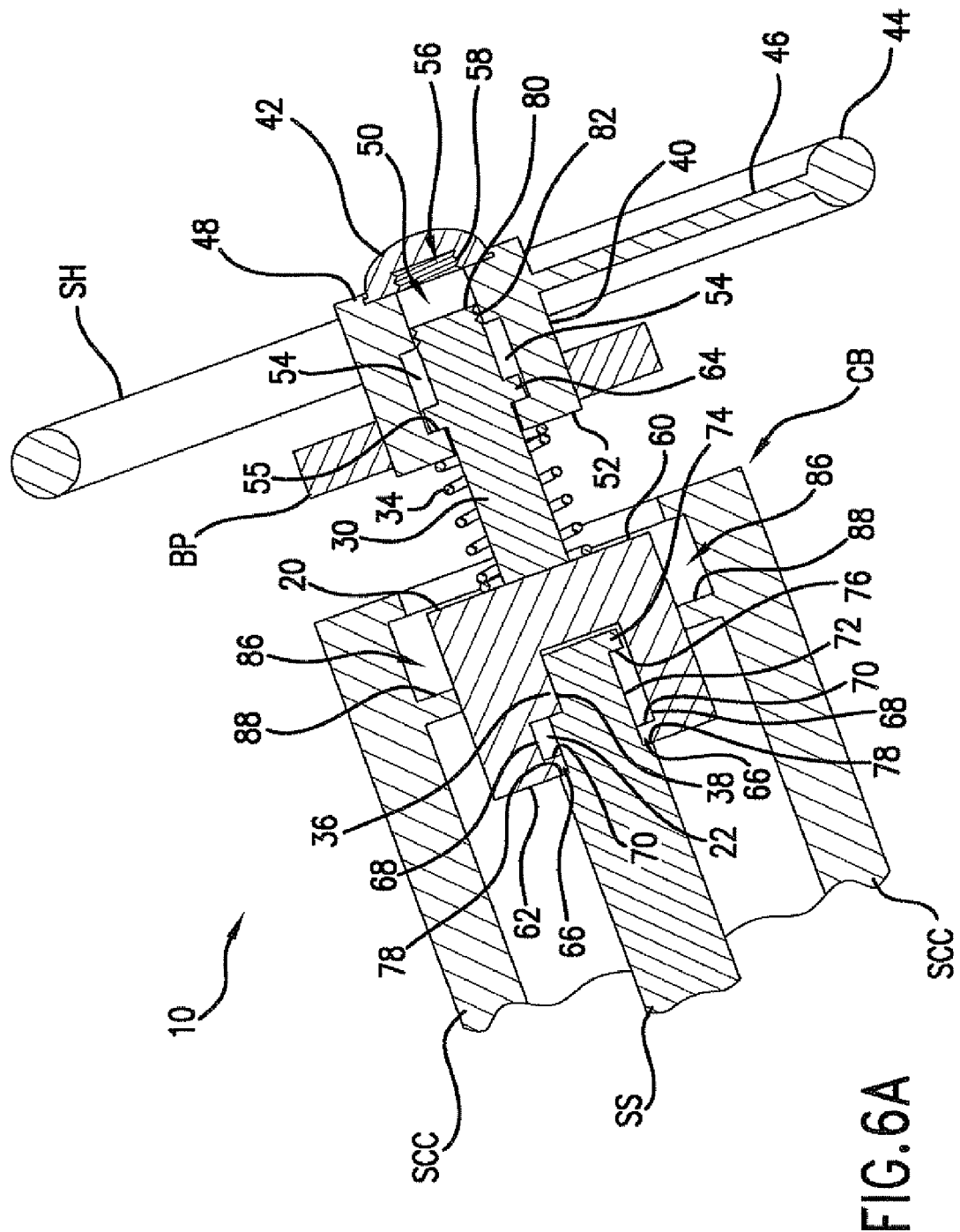
FIG. 6A illustrates a longitudinal cross-sectional view of a portion of an embodiment of a hybrid steering apparatus according to the present subject matter with a steering handle coupled with a steering shaft.
Figure 6B:
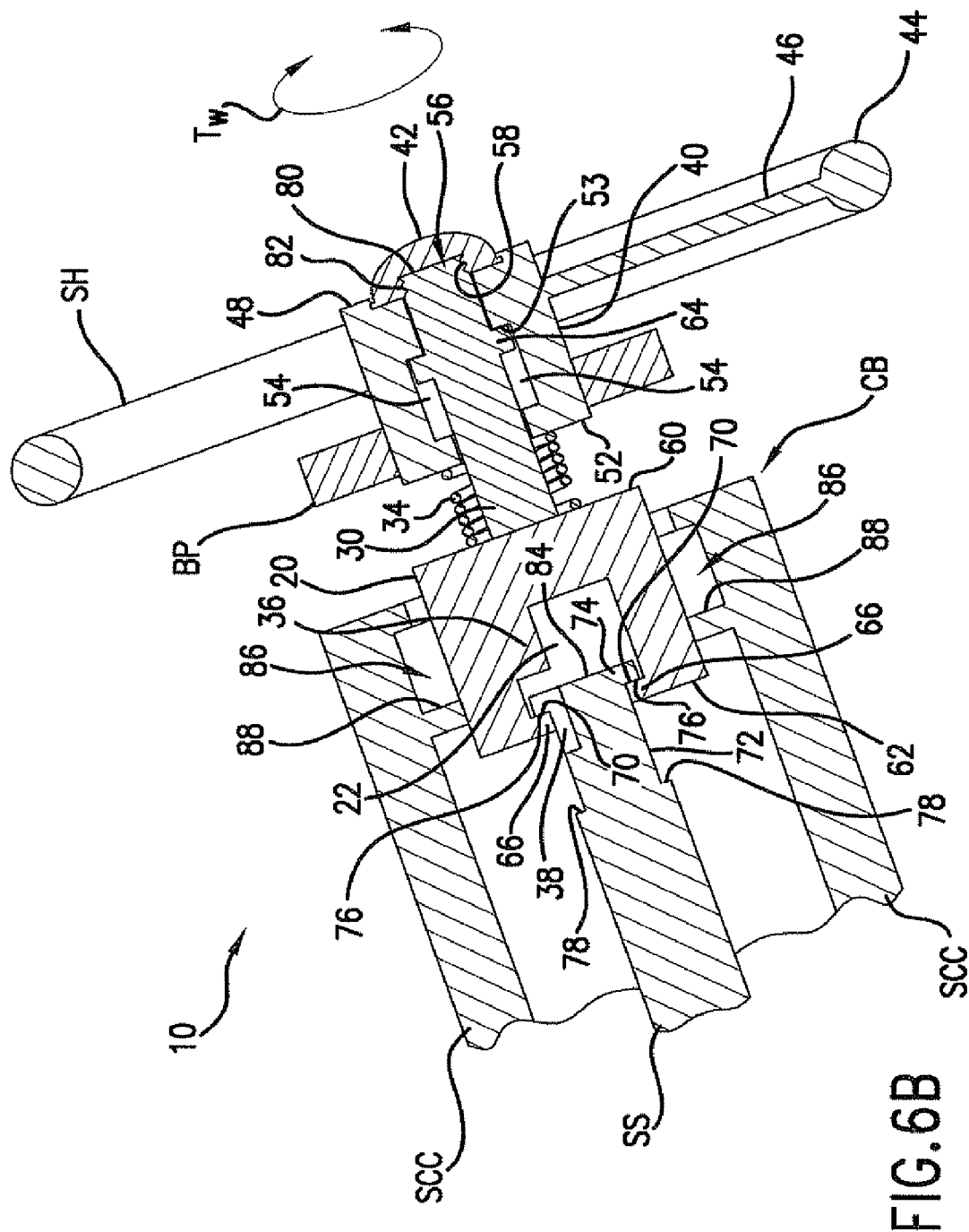
FIG. 6B illustrates a longitudinal cross-sectional view of the hybrid steering apparatus according to FIG. 6A with the steering handle decoupled from the steering shaft.

FIGS. 6A and 6B illustrate a cross-section view of an embodiment of a steering control apparatus for a riding vehicle V in accordance with the present disclosure. Steering control apparatus 10 can include a steering handle SH that can be connected to steering shaft SS by a coupling base, generally designated as CB. Steering handle SH can include a hub 40 and a handle 44. Handle 44 can be in the form of a wheel which is connected to hub 40 by one or more bridges 46 dispersed about hub 40. Hub 40 can have a locking cam 42 disposed about top portion 48 of hub 40. Hub 40 can include an aperture 50 that extends from bottom side 52 through top portion 48 of hub 40. One or more keyways 54 can be defined within hub 40 such that they are in communication with aperture 50 which extends through hub 40. Locking cam 42 can have an aperture 56 which can align with aperture 50 at top portion 48 of hub 40. Aperture 56 can have walls which can define a thread 58 within cam 42.

Coupling base CB can include a body 20 which can define a chamber 22 therein. Body 20 can have a top end 60 and a bottom end 62 with chamber 22 being defined within bottom end 62. A connection shaft 30 can extend from top end 60 of body 20 of coupling base CB. Connection shaft 30 can extend into aperture 50 of hub 40. Connection shaft 30 can include one or more keys 64 which engage the one or more keyways 54 defined within hub 40 which are in communication with aperture 50 therein. In this manner, coupling base CB can be secured to steering handle SH.

Chamber 22 within body 20 of coupling base CB can be configured to receive steering shaft SS therein. Body 20 can have a circular cross-section which can be transverse to the cross-sectional view shown in FIGS. 6A and 6B. Body 20 can have a lip 66 which can extend into chamber 22 on bottom end 62 of body 20. Chamber 22 can extend on the other side of lip 66 up to inner walls 68 within body 20. Thereby, abutments 70 can be formed on the inside of lip 66. Further, a key 36 can extend into chamber 22 that can be used to engage a keyway 38 within steering shaft SS.

Steering shaft SS can also have a circular cross-section in a direction transverse to the cross-sectional view shown in FIGS. 6A and 6B. A groove 72 can be formed in steering shaft SS around its circumference thereby forming a head 74 on steering shaft SS. Groove 72 can define an abutment surface 76 on head 74 of steering shaft SS as well as an abutment surface 78 on the other wall formed by groove 72. The steering shaft SS can be placed within chamber 22 of body 20 of coupling base CB. For example, coupling base CB can be composed of one or more pieces which can be secured together around steering shaft SS such that circular lip 66 can extend within groove 72 of steering shaft SS. In this manner, body 20 of coupling base CB can move from an engaged position with steering shaft SS as shown in FIG. 6A to a disengaged position with steering shaft SS shown in FIG. 6B. Thereby, steering handle SH can turn steering shaft SS when body 20 is in the engaged position as shown in FIG. 6A such that steering handle SH is coupled to steering shaft SS. At the same time, steering shaft SS can rotate freely within chamber 22 of body 20 of coupling base CB when body 20 is disengaged from steering shaft SS as shown in FIG. 6B, thereby permitting steering handle SH to be decoupled from steering shaft SS.

As shown in FIG. 6A, steering handle SH is coupled to steering shaft SS so that as steering handle SH is turned, so turns the steering shaft SS and the steering assembly to which the pair of front wheels of the vehicle are attached. As steering handle SH is turned, hub 40 turns connection shaft 30 via keys 64 and keyway 54. The rotation of connection shaft 30 can turn body 20 of coupling base CB. A bias element 34 can be placed between bottom side 52 of hub 40 and top side 60 of body 20. Bias element 34 can extend connection shaft 30 to its downward position within aperture 50 and keyways 54 such that keys 64 integral with shaft 30 abut abutment surfaces 55 within keyways 54. Bias element 34 can be any known structure or material which is compressible and would bias body 20 toward steering shaft SS. For example, bias element 34 can be a spring, a resilient plastic or metal material, or the like. In the embodiment shown, bias element 34 is a compression spring. The forces of bias element 34 push coupling base CB toward steering shaft SS. However, coupling base CB will not engage steering shaft SS until proper alignment occurs between key 36 and keyway 38 within chamber 22.

Upon proper alignment, coupling base CB engages steering shaft SS. Thus, as turning of steering handle SH turns connection shaft 30 and body 20 of coupling base CB, steering shaft SS is also turned.

Connection shaft 30 has a head 80 which includes a connecting thread 82. Upon disengagement of coupling base CB from shaft SS, threaded portion 58 within aperture 56 of locking cam 42 can engage connection thread 82 of head 80 of connection shaft 30 to hold coupling base CB in a disengaged position such that steering handle SH is decoupled from steering shaft SS as shown in FIG. 6B.

In this decoupled position, connection shaft 30 is extended to its furthest point within hub 40 such that keys 64 abut abutment walls 53 of keyways 54 within hub 40. Further, connection shaft 30 can extend all the way through aperture 50 so that locking cam 42 can be twisted on through head 80 so that threaded portion 58 of aperture 56 in locking cam 42 engage connection threads 82 of head 80. As shown by the arrows $T_w$, locking cam 42 can be twisted in either direction with one direction locking connection shaft 30, and thus body 20 of coupling base CB in this disengaged position. In such position, with connection shaft 30 extending through hub 40, bias element 34 is compressed thereby storing more potential energy. When locking cam 42 is twisted in the other direction, locking cam 42 disengages connection shaft 30 such that the potential energy within bias element 34 pushes connection shaft 34 and body 20 of coupling base CB toward steering shaft SS. If key 36 is not aligned with keyway 38 of steering shaft SS, key 36 will rest against top 84 of steering shaft SS until key 36 aligns with keyway 38 and bias element 34 pushes coupling base CB into an engagement with steering shaft SS.

In a disengaged position shown in FIG. 6B, head 74 of steering shaft SS can float within chamber 22 such that steering shaft SS can freely rotate without rotating coupling base GB and thus steering handle SH. Alternatively, abutment side 76 of head 74 can abut against abutment 70 of lip 66 in such a manner where limited friction is created between the two surfaces.

Coupling base CB can be in contact with a portion of the steering column cover SCC to add at least some support to coupling base CB, while still permitting rotation of coupling base CB. Support members 88, which can extend from steering column cover SCC and help support coupling base CB, can be minimal in size and should not interfere with the rotation of coupling base CB or control levers and associated control cables attached thereto. Such support members 88 can be absent in other embodiments, especially embodiments that employ body portions BP which help to secure hub 40 of steering handle SH in place.

Space 86 can be provided between steering column cover SCC and coupling base CB to permit movement of control levers for operating the brake clutches for the rear wheels and arms that attach such control levers to coupling base CB. Such space 86 permits the arms and the portion of the control levers that attach to coupling base CB to rotate with coupling base CB. Further, as stated above, a body portion BP of the frame or body of vehicle V can hold hub 40 of steering handle SH in place while still permitting rotation of steering handle SH. Such body portion BP can hold hub 40 in place while coupling base CB is pulled upward with connection shaft 30 moving within hub 40. Such body portion BP can include a bearing which surrounds hub 40 to facilitate rotation of steering handle SH.

Figure 7A:
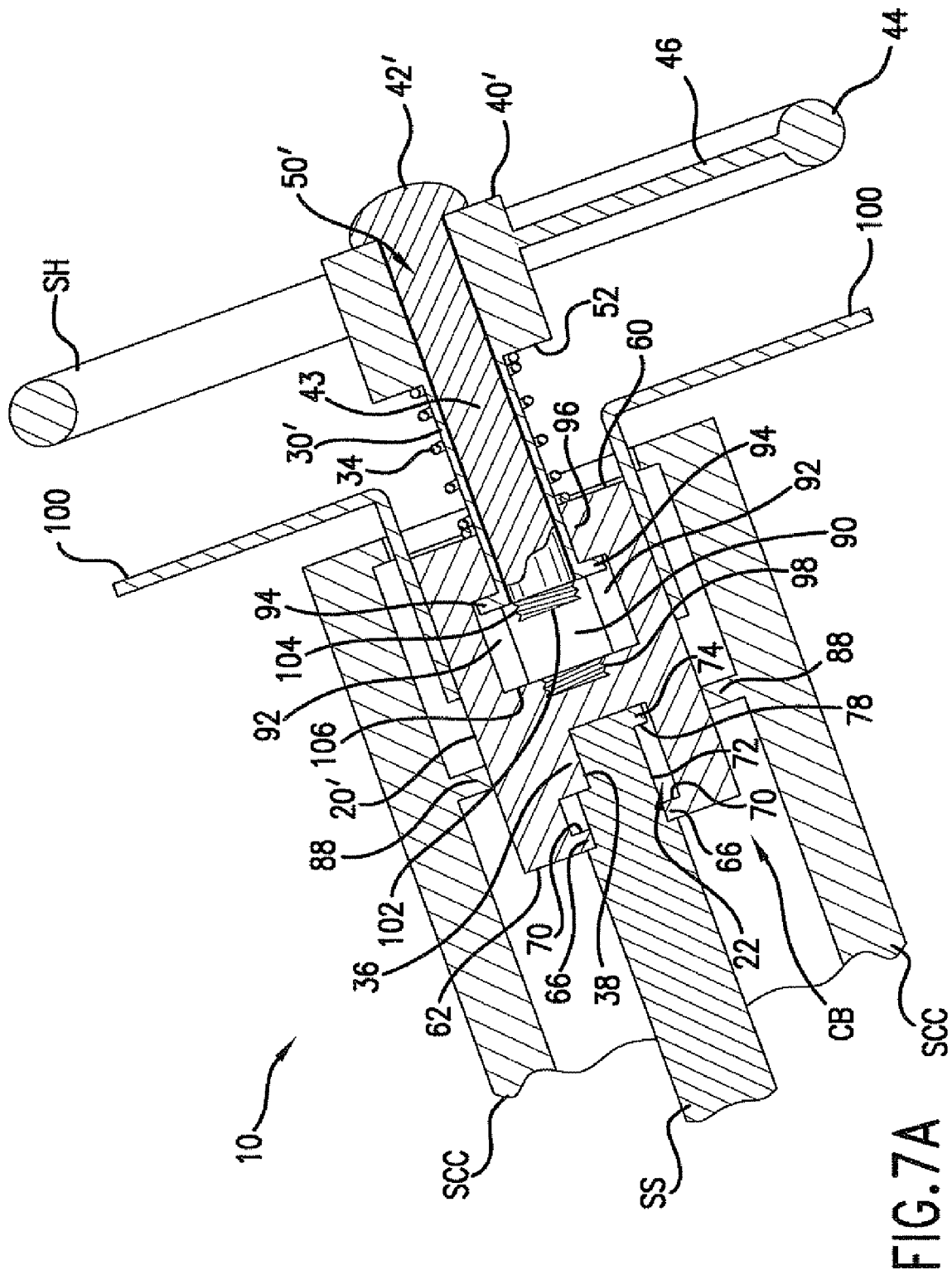
FIG. 7A illustrates a longitudinal cross-sectional view of a portion of an embodiment of a hybrid steering apparatus according to the present subject matter with a steering handle coupled with a steering shaft.
Figure 7B:
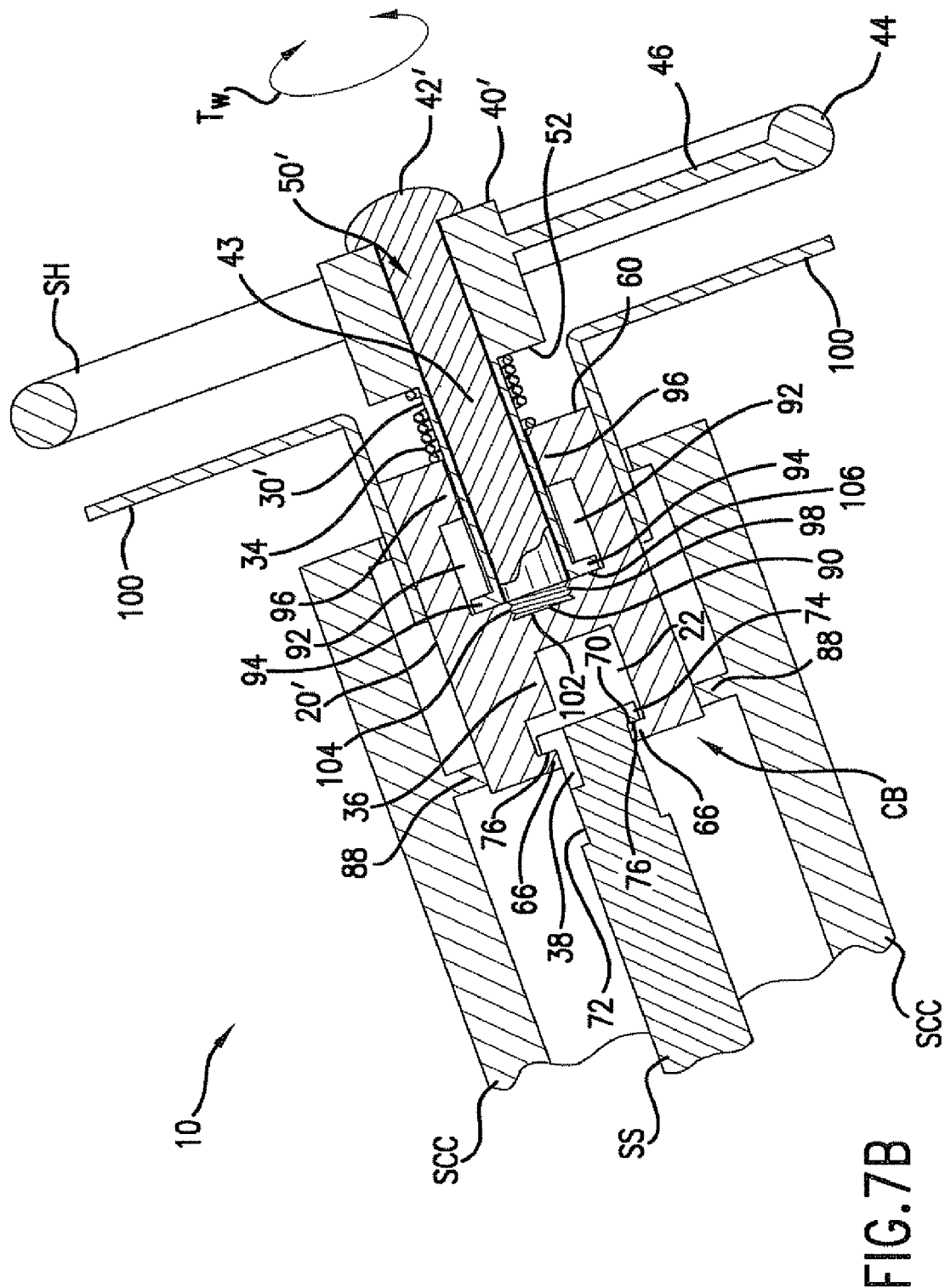
FIG. 7B illustrates a longitudinal cross-sectional view of the hybrid steering apparatus according to FIG. 7A with the steering handle decoupled from the steering shaft.

FIGS. 7A and 7B show a further embodiment of a steering control apparatus 10. A portion of steering apparatus 10 can include steering handle SH which can be secured to coupling base CB that can disengage and engage steering shaft SS. Steering handle SH can include a handle 44 which is connected through one or more bridge members 46 to a hub 40'. Hub 40' can be integrally formed with connection shaft 30'. An aperture 50' can be defined through hub 40' and shaft 30' such that a locking cam 42' can have a stem 43 which can extend through aperture 50'. Stem 43 of locking cam 42' can include a head 102 that defines a connection thread 104.

Coupling base CB can include a body 20' which can have an upper end 60 and a bottom end 62. A chamber 90 can be defined in upper end 60 of body 20 into which connection shaft 30' and stem 43 of locking cam 42' can extend. Chamber 90 can also define one or more keyways 92 in which keys 94 integral to connection shaft 30' can reside. Upper end 60 can define a lip 96 against which keys 94 can abut to keep coupling base CB secured to steering handle SH. A threaded portion 98 can be position at the lower end of chamber 90.

Bottom portion 62 can define a chamber 22 in body 20' for receipt of the steering shaft SS in a similar manner as described above with regard to the embodiment shown in FIGS. 6A and 6B. In operation, lip 66 can extend into groove 72 which can run around the circumference of steering shaft SS. A head 74 can be defined by steering shaft SS in which a keyway 38 is formed. A key 36 that can be integral to body 20' of coupling base CB can extend within chamber 22 and engage keyway 38 of steering shaft SS when coupling base CB and steering shaft SS are properly aligned.

A bias element 34 can be placed about connection shaft 30' between bottom 52 of hub 40' and upper end 60 of body 20 of coupling base CB to bias coupling base CB towards steering shaft SS. Handles 100 can be secured to coupling base CB in addition to control levers (not shown) that are used to operate brake clutches within the drive system. Handles 100 can be rigidly attached to coupling base CB and allow coupling base CB to be pulled forward toward hub 40' of steering handle SH. Such movement of coupling base CB compresses bias element 34 as coupling base CB moves upward on connection shaft 30'. As coupling base CB moves upward, thread portion 98 of chamber 90 moves toward threads 104 of stem 43 of locking cam 42 as keys 94 slide within keyways 92 of chamber 90. Upon abutment of keys 94 against walls 106 of keyways 92, connection thread 104 of head 102 of stem 43 can then engage thread portion 98 defined within chamber 90. As locking cam 42' is twisted in this manner, coupling base CB is locked in a disengaged position from steering shaft SS such that key 36 within chamber 22 is disengaged from keyway 38 defined in steering shaft SS permitting steering shaft SS to rotate freely within chamber 22. Steering handle SH can be held in an axially stationary position that permit rotation of steering handle SH, for example, by a portion of the frame or body (not shown) so that coupling base CB can be moved along connection shaft 30' without steering handle SH axially moving. Handles 100 permit the easy movement of coupling base CB towards hub 40'. In this manner, steering handle SH is decoupled from steering shaft SS so that steering shaft SS can freely rotate without steering handle SH also rotating. In this manner, control levers (not shown) can be used to steer the vehicle to which the steering control apparatus is attached.

In the locked position shown in FIG. 7B, abutment surface 70 of lips 66 of body 20' can abut abutment surface 76. In such a position, the friction between the surfaces can be minimized. In alternative embodiments, head 74 can float within chamber 22 to further facilitate free rotation of steering shaft 5S. As described above, support bridge members 88 can extend between steering column cover SCC and coupling base CB to aid in supporting coupling base CB while minimizing friction between support members 88 and coupling base CB.

Embodiments of the present disclosure shown in the drawings and described above are exemplary of numerous embodiments that can be made within the scope of the appending claims. It is contemplated that the configurations of a hybrid steering apparatuses and methods of use of the same can comprise numerous configurations other than those specifically disclosed. The scope of a patent issuing from this disclosure will be defined by these appending claims.

What is claimed is:

1. A steering control apparatus for a vehicle, comprising:
   a steering shaft drivingly linked to front wheels of a vehicle;
   a movable steering handle disposed about the steering shaft, the steering handle being configured for selectively turning the front wheels to direct movement of the vehicle;
   first and second brake clutch mechanisms for engaging and disengaging first and second drive wheels, respectively;
   first and second brake clutch control levers for selectively controlling the first and second brake clutch mechanisms, respectively, to engage and disengage the first and second drive wheels; and
   the steering handle configured for coupling with the steering shaft where the steering handle can be used to turn the front wheels, and the steering handle configured for decoupling from the steering shaft where the front wheels are allowed to turn free of the steering handle while the steering handle is still disposed about the steering shaft.

2. The apparatus according to claim 1 wherein the steering handle comprises a coupling base configured for interconnecting the steering shaft and the steering handle, where the coupling base is configured for coupling the steering handle with the steering shaft and decoupling the steering handle from the steering shaft.

3. The apparatus according to claim 2 wherein the first and second brake clutch levers are secured to the coupling base.

4. The apparatus according to claim 3 wherein the first and second brake clutch levers can be used to decouple the steering handle from the steering shaft.

5. The apparatus according to claim 2 further comprising a lock device that locks the coupling base in a position where the steering handle is decoupled from the steering shaft.

6. The apparatus according to claim 5 wherein the lock device is a twist cam disposed in the steering handle.

7. The apparatus according to claim 2 wherein the front wheels are coupled together so that the front wheels are generally in parallel alignment.

8. The apparatus according to claim 7 wherein the coupling base couples the steering handle to the steering shaft when the front wheels are aligned to drive the vehicle straightforward.

9. The apparatus according to claim 2 further comprising a bias element for biasing the coupling base towards the steering shaft when the steering handle is decoupled from the steering shaft.

10. The apparatus according to claim 2 wherein the steering shaft and coupling base are configured to have a key and keyway arrangement that permit the steering handle to control rotation of the steering shaft when the steering handle is coupled to the steering shaft.

11. The apparatus according to claim 2 further comprising handles secured to the coupling base that permit coupling and decoupling of the steering handle from the steering shaft.

12. The apparatus according to claim 1 wherein the first and second brake clutch control levers are used to steer the vehicle when the steering handle is decoupled from the steering shaft.

13. A steering control apparatus for a vehicle, comprising:
   a steering shaft drivingly linked to front wheels of a vehicle;
   a movable steering handle disposed about the steering shaft, the steering handle being configured for selectively turning the front wheels to direct movement of the vehicle;
   first and second brake clutch mechanisms for engaging and disengaging first and second drive wheels, respectively;
   first and second brake clutch control levers for selectively controlling the first and second brake clutch mechanisms, respectively, to engage and disengage the first and second drive wheels;

the steering handle including a coupling base configured for interconnecting the steering shaft and the steering handle, the coupling base configured for coupling with the steering shaft where the steering handle can be used to turn the front wheels and for decoupling from the steering shaft where the front wheels are allowed to turn free of the steering handle while the steering handle is still disposed about the steering shaft; and a bias element for biasing the coupling base towards the steering shaft when the steering handle is decoupled from the steering shaft.

14. The apparatus according to claim 13 wherein the first and second brake clutch levers are secured to the coupling base.

15. The apparatus according to claim 14 wherein the first and second brake clutch levers can be used to decouple the steering handle from the steering shaft.

16. The apparatus according to claim 13 further comprising a lock device that locks the coupling base in a position where the steering handle is decoupled from the steering shaft.

17. The apparatus according to claim 16 wherein the lock device is a twist cam disposed in the steering handle.

18. The apparatus according to claim 13 wherein the front wheels are coupled together so that the front wheels are generally in parallel alignment.

19. The apparatus according to claim 18 wherein the coupling base couples the steering handle to the steering shaft when the front wheels are aligned to drive the vehicle straightforward.

20. The apparatus according to claim 13 wherein the steering shaft and coupling base are configured to have a key and keyway arrangement that permit steering handle to control rotation of the steering shaft when the steering handle is coupled to the steering shaft.

21. A method for providing steering control to a vehicle, comprising:

providing a steering handle including a coupling base, the coupling base engaging the steering handle to a steering shaft of the vehicle;

providing first and second brake clutch control levers for selectively controlling the first and second brake clutch mechanism, respectively, to engage and disengage first and second drive wheels of the vehicle;

decoupling the steering handle from the steering shaft through the coupling base such that the vehicle can be steered by the control levers without rotation of the steering handle; and coupling the steering handle with the steering shaft through the coupling base such that the vehicle can be steered by the steering handle.

22. The method as in claim 21, further comprising locking the coupling base of the steering handle in a disengaged position when the steering handle is decoupled.

23. The method as in claim 22, further comprising biasing the coupling base of the steering handle toward an engaged position to couple the steering handle to the steering shaft.

24. The method as in claim 21, further comprising coupling the steering handle to the steering shaft when the pair of front wheels is aligned to drive the vehicle straightforward.

25. A steering control apparatus for a vehicle, comprising:

a steering shaft drivingly linked to a pair of front wheels of a vehicle;

a movable steering handle disposed about the steering shaft, the steering handle capable of selectively turning the pair of front wheels to direct the movement of the vehicle;

first and second brake clutch mechanisms for engaging and disengaging first and second drive wheels, respectively;

first and second brake clutch control levers for selectively controlling the first and second brake clutch mechanisms, respectively, to engage and disengage the first and second drive wheels;

a coupling base configured for interconnecting the steering shaft and the steering handle, the coupling base configured for coupling with the steering shaft where the steering handle can be used to turn the front wheels and for decoupling from the steering shaft where the front wheels are allowed to turn free of the steering handle while the steering handle is still disposed about the steering shaft.

* * * * *